United States Patent Office 3,816,605
Patented June 11, 1974

3,816,605
METHOD OF PROCESSING ALUMINUM-CONTAINING ORES
Milan Belsky, Schwandorf, Germany, assignor to Vereinigte Aluminium-Werke Aktiengesellschaft, Bonn, Germany
No Drawing. Continuation-in-part of abandoned application Ser. No. 248,521, Apr. 28, 1972. This application Aug. 31, 1972, Ser. No. 285,519
Claims priority, application Germany, Apr. 29, 1971, P 21 21 094.6
Int. Cl. C01b 7/08; C01f 7/02, 7/56
U.S. Cl. 423—626
5 Claims

ABSTRACT OF THE DISCLOSURE

Aluminum ores containing aluminum in the form of aluminum silicates are leached with an aqueous solution of hydrochloric and fluosilicic acid. The addition of the fluosilicic acid eliminates the need for the calcination of the aluminum ore prior to the acid treatment.

CROSS-REFERENCE TO RELATED APPLICATIONS

This application is a continuation-in-part of application Ser. No. 248,521 filed by the same inventor in respect of the same subject matter on Apr. 28, 1972, now abandoned.

BACKGROUND OF THE INVENTION

Low yields result in straight acid extraction of aluminum ores and similar materials containing aluminum silicates, such as kaolinite, $Al_2O_3 \cdot 2SiO_2 \cdot 2H_2O$. Acceptable yields are obtained only if the kaolinite present is dehydrated and decomposed to amorphous alumina and silica by heating to 600 to 750° C. prior to the acid treatment. The amorphous alumina thus formed is then readily soluble in hot dilute acids. The costly calcination step was therefore considered indispensable for the acid leaching of aluminum-silicate ores.

The object of the present invention is to avoid the calcination step by providing for a process whereby the aluminum silicates can be decomposed without prior resort to thermal treatment.

DETAILS OF THE INVENTION AND SPECIFIC EMBODIMENT

The invention is based on the surprising finding that the addition of the rather inexpensive fluosilicic acid, $H_2SiF_6$, to the aqueous solution of the hydrochloric acid, as employed for leaching ores, does break up the crystalline structure to an extent similar to that accomplished with the calcined material under comparable conditions.

The reaction mechanism involved is of a complex nature. In the first phase, fluosilicic acid reacts with aluminum silicate, forming aluminum fluosilicate, $Al_2(SiF_6)_3$, and disrupting some of the alumino-silicate bonds. Aluminum fluosilicate then hydrolyzes in the hot acid medium, forming aluminum fluoride, silica, and hydrogen fluoride.

The over-all effect of this chain of parallel and consecutive reactions is the disintegration of the silicate structures accompanied by a considerable increase in the yield of the alumina extraction. Thus yields up to 97% of the aluminum present in the ore are regularly obtainable.

The process will further be explained by the following:

EXAMPLE

| Loss on ignition | Percent |
|---|---|
| $Al_2O_3$ | 53.91 |
| $SiO_2$ | 23.40 |
| $Fe_2O_3$ | 4.76 |
| $TiO_2$ | 2.74 |
| (L. O. I.) | 14.66 |
| Others | 0.53 |

The specific gravity of the clay was 2890 kg./m.³.

The clay material having the foregoing composition was crushed and wet-ground in the recycled mother liquid and wash liquid to a slurry containing 980 kg. of solids/m.³. From a supply vessel 1 m.³/hr. of the wet slurry was pumped to four tanks provided with stirrers and connected in series. Each tank had a heating coil and was linked to a common reflux condenser. Simultaneously, 6670 kg./hr. of a 21% hydrochloric acid and 150 kg./hr. of a 20% fluosilicic acid were fed to the first stirrer tank. Concentrations between 1 and 5% by weight of fluosilicic acid and between 15 and 25% by weight of hydrochloric acid may be used to advantage.

The active volume of each of the reactors was approximately 1.6 m.³. The total residence time of the reaction mixture in the reactor cascade was approximately 4 hours, during which time the mixture was kept boiling at 108 to 105° C. Dependent upon the particular ore, shorter periods of 3 hours or, in some cases, as short as 1 hour, may be found to be adequate for this purpose.

The leaching liquor then was passed to a thickener, whose underflow was filtered through a vacuum filter. The clear overflow of the thickened and the filtrate were then united for further processing.

The filter cake was washed with the fresh hydrochloric acid entering the leaching cascade and then dumped. The weight of solids in the cake was 286 kg./hr. The cake composition was as follows:

| | Percent |
|---|---|
| $Al_2O_3$ | 7.39 |
| $SiO_2$ | 80.24 |
| $Fe_2O_3$ | 0.16 |
| $TiO_2$ | 4.70 |
| L. O. I. | 7.51 |

On an hourly basis 30 kg./hr. of $H_2SiF_6$ were added to 980 kg./hr. of ore, which is approximately 3.1% of ore weight, and 507 kg./hr. $Al_2O_3$ were dissolved, i.e. 96.0% of the alumina content of the processed ore was extracted. There were obtained as the filtrate, approximately 6.9 m.³/h. of clear solution, which contained 343 kg. free HCl and was essentially free of colloidal or suspended silica (less than 0.02 g./l.). Its total fluorine content was 3.09 g./l.

In this solution the concentration of the free hydrochloric acid was then increased by adding 1430 kg./hr. of approximately 32% by weight of hydrochloric acid in order to establish optimum operating conditions for the extraction of ferric chloride from the solution, the aqueous solution after the adjustment contained about 220 kg./m.³ of free HCl.

The extraction was effected by passing 8.1 m.³/hr. of the aqueous solution through a series of four mixer-settler extractors together with 800 kg./hr. of isopropyl ether, the latter moving in countercurrent to the aqueous phase. During the extraction step, about 94 kg./hr. of ferric chloride, 21 kg./hr. of hydrogen chloride and 110 kg./hr. of water passed into the organic phase, leaving the aqueous phase virtually free of ferric chloride.

In the aqueous phase, about 10 kg./hr. of isopropyl ether were dissolved. The latter was recovered by distilling off about 20 kg./hr. of a heterogeneous distillate, which was recycled to the first mixer-settler.

From the organic phase, ferric chloride was reextracted in three mixer-settler extractors connected in series, using 1% by wt. of hydrochloric acid moving at a rate of 450 kg./hr. in countercurrent to the organic phase. Isopropyl ether was recycled into the extraction operation. The ferric chloride solution could be further processed or directly employed as such for general use.

From the purified aqueous solution of aluminum chloride obtained during the extraction step, the pure crystalline chloride was precipitated by saturating the liquid with gaseous hydrogen chloride. Instead HCl diluted with inert gases could also be used. As soon as the liquid contained about 34 wt. percent of hydrogen chloride, crystals no longer settled out. The crystals were then separated, from the mother liquor and washed with 32 to 35 wt. percent hydrochloric acid (iron-free).

2354 kg./hr. of $AlCl_3 \cdot 6H_2O$ were thus obtained. The yield of the precipitation accordingly was about 98%.

The mother liquor and wash liquid were then united and recycled into the ore-leaching step.

By subsequent conventional thermal decomposition at 1300–1400° C. of the wet crystals of the precipitated aluminum chloride hexahydrate a high-quality alumina was obtained which could be used as such in the production of high-purity aluminum metal. Hydrogen chloride is also formed by the thermal decomposition of the $AlCl_3 \cdot 6H_2O$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A process for the production of aluminum oxide substantially free from iron from an uncalcined aluminum ore containing aluminum silicate and ferric iron which comprises heating the uncalcined ore in an aqueous mixture of hydrochloric and fluosilicic acid until a substantial proportion of the aluminum compounds, including the aluminum silicate, are dissolved therein, separating the undissolved solids from the resulting solution and extracting the aqueous acidic solution with isopropyl ether to separate ferric chloride therefrom, recovering the aluminum chloride from the aqueous acidic solution in the form of aluminum chloride hexahydrate crystals by saturating the solution with gaseous hydrogen chloride and subsequently subjecting the aluminum chloride hexahydrate to thermal decomposition at an elevated temperature to form hydrogen chloride and aluminum oxide.

2. A process as defined in claim 1 in which the ore is heated in the aqueous mixture of hydrochloric and fluosilicic acid at its boiling point for a period of at least 1 hour.

3. A process as defined in claim 2 in which the period of heating is between 3 and 4 hours.

4. A process as defined in claim 1 in which the aqueous mixture of hydrochloric and fluosilicic acids contains between 1 and 5% by weight of fluosilicic acid and between 15 and 25% by weight of hydrochloric acid.

5. A process as defined in claim 1, wherein said thermal decomposition is carried out at a temperature of between 1300° and 1400°.

References Cited
UNITED STATES PATENTS

| | | | |
|---|---|---|---|
| 1,797,994 | 3/1931 | Morrow | 423—489 UX |
| 2,376,696 | 5/1945 | Hixson et al. | 423—481 X |
| 2,413,709 | 1/1947 | Hoffman | 423—481 X |
| 3,082,062 | 3/1963 | Preuss, Jr. | 423—495 X |
| 3,622,269 | 11/1971 | Yamamura et al. | 423—150 X |

EDWARD STERN, Primary Examiner

U.S. Cl. X.R.

423—139, 481, 495